US012367850B2

(12) United States Patent
Gong (10) Patent No.: US 12,367,850 B2
(45) Date of Patent: Jul. 22, 2025

(54) IMAGE OBTAINING METHOD AND APPARATUS, SERVER, AND ELECTRONIC DEVICE

(71) Applicant: VIVO MOBILE COMMUNICATION CO., LTD., Dongguan (CN)

(72) Inventor: Fei Gong, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 253 days.

(21) Appl. No.: 18/118,091

(22) Filed: Mar. 6, 2023

(65) Prior Publication Data

US 2023/0206878 A1    Jun. 29, 2023

Related U.S. Application Data

(63) Continuation of application No. PCT/CN2021/116238, filed on Sep. 2, 2021.

(30) Foreign Application Priority Data

Sep. 4, 2020 (CN) .......................... 202010922592.8

(51) Int. Cl.
*G09G 5/00* (2006.01)
*G06T 3/40* (2024.01)
(52) U.S. Cl.
CPC ............... *G09G 5/005* (2013.01); *G06T 3/40* (2013.01); *G09G 2340/045* (2013.01); *G09G 2340/0464* (2013.01)
(58) Field of Classification Search
CPC ............. G09G 5/005; G09G 2340/045; G09G 2340/0464; G06T 3/40
See application file for complete search history.

(56) References Cited

U.S. PATENT DOCUMENTS

| 9,519,624 | B1 | 12/2016 | Genoni et al. | |
|---|---|---|---|---|
| 2014/0204244 | A1* | 7/2014 | Choi | H04N 23/64 |
| | | | | 348/333.05 |
| 2015/0268850 | A1 | 9/2015 | Zhang et al. | |

FOREIGN PATENT DOCUMENTS

| CN | 101778168 A | 7/2010 |
|---|---|---|
| CN | 102662616 A | 9/2012 |
| CN | 104461300 A | 3/2015 |
| CN | 104504651 A | 4/2015 |
| CN | 104932923 A | 9/2015 |

(Continued)

OTHER PUBLICATIONS

Extended European Search Report issued in related European Application No. 21863662.9, mailed Nov. 20, 2023, 8 pages.

(Continued)

*Primary Examiner* — Phuc N Doan
(74) *Attorney, Agent, or Firm* — IPX PLLC (57) ABSTRACT

An image obtaining method and apparatus, a server, and an electronic device are provided. The method includes: receiving screen size information sent by an electronic device; determining a target preview that matches the screen size information; and sending the target preview to the electronic device. The target preview may be determined based on the screen size information of the electronic device, so that the electronic device may display the target preview that matches the screen size information of the electronic device, thereby improving a display effect of the preview.

2 Claims, 6 Drawing Sheets

(56) References Cited

FOREIGN PATENT DOCUMENTS

| | | | | |
|---|---|---|---|---|
| CN | 105578268 | B | * | 6/2016 |
| CN | 106293589 | A | * | 1/2017 |
| CN | 106406794 | A | | 2/2017 |
| CN | 106528109 | A | | 3/2017 |
| CN | 108595239 | A | | 9/2018 |
| CN | 109189533 | A | | 1/2019 |
| CN | 109683895 | A | | 4/2019 |
| CN | 109729423 | A | | 5/2019 |
| CN | 111552530 | A | | 8/2020 |
| CN | 112055244 | A | | 12/2020 |
| CN | 112911152 | A | * | 1/2021 |
| JP | 2005258634 | A | | 9/2005 |

OTHER PUBLICATIONS

International Search Report issued in corresponding International Application No. PCT/CN2021/116238, mailed Dec. 2, 2021, 5 pages.

* cited by examiner

IMAGE OBTAINING METHOD AND APPARATUS, SERVER, AND ELECTRONIC DEVICE

CROSS-REFERENCE TO RELATED APPLICATIONS

This application is a continuation of International Application No. PCT/CN2021/116238, filed on Sep. 2, 2021, which claims priority to Chinese Patent Application No. 202010922592.8 filed on Sep. 4, 2020. The entire contents of each of the above-referenced applications are expressly incorporated herein by reference.

TECHNICAL FIELD

This application pertains to the field of computer technologies, and specifically relates to an image obtaining method and apparatus, a server, and an electronic device.

BACKGROUND

Currently, with increasing popularity of electronic devices, the electronic devices have increasingly more screen sizes. Because screen sizes of electronic devices are different, for display of previews of a same size, a black side may appear on some electronic devices when the preview is displayed, that is, a size of the preview does not match a screen size, and consequently, the preview cannot cover the entire screen, and a black side appears.

In other words, the size of the current preview does not match the screen size of the electronic device, and a poor display effect is caused.

SUMMARY

Embodiments of this application are to provide an image obtaining method and apparatus, a server, and an electronic device.

This application is implemented as follows:

According to a first aspect, an embodiment of this application provides an image obtaining method, applied to a server, and including:
receiving screen size information sent by an electronic device;
determining a target preview that matches the screen size information; and
sending the target preview to the electronic device.

According to a second aspect, an embodiment of this application provides an image obtaining method, applied to an electronic device, and including:
sending screen size information of the electronic device to a server;
receiving a target preview that is sent by the server and that matches the screen size information; and
displaying the target preview.

According to a third aspect, an embodiment of this application provides an image obtaining apparatus, applied to a server, and including:
a receiving module, configured to receive screen size information sent by an electronic device;
a determining module, configured to determine a target preview that matches the screen size information; and
a sending module, configured to send the target preview to the electronic device.

According to a fourth aspect, an embodiment of this application provides an image obtaining apparatus, applied to an electronic device, and including:
a sending module, configured to send screen size information of the electronic device to a server;
a receiving module, configured to receive a target preview that is sent by the server and that matches the screen size information; and
a display module, configured to display the target preview.

According to a fifth aspect, an embodiment of this application provides a server, including a processor, a memory, and a program or an instruction that is stored in the memory and that can run on the processor, and when the program or the instruction is executed by the processor, steps in the image obtaining method described in the first aspect are implemented.

According to a sixth aspect, an embodiment of this application provides an electronic device. The electronic device includes a processor, a memory, and a program or an instruction that is stored in the memory and that can run on the processor, and when the program or the instruction is executed by the processor, steps in the method described in the second aspect are implemented.

According to a seventh aspect, an embodiment of this application provides a readable storage medium. A program or an instruction is stored on the readable storage medium, and when the program or the instruction is executed by a processor, steps in the method described in the first aspect are implemented, or when the program or the instruction is executed by the processor, steps in the method described in the second aspect are implemented.

According to an eighth aspect, an embodiment of this application provides a chip, where the chip includes a processor and a communication interface, the communication interface is coupled to the processor, and the processor is configured to run a program or an instruction to implement the method described in the first aspect or the second aspect.

In this embodiment of this application, the screen size information sent by the electronic device is received, the target preview that matches the screen size information is determined, and the target preview is sent to the electronic device. The target preview may be determined based on the screen size information of the electronic device, so that the electronic device may display the target preview that matches the screen size information of the electronic device, thereby improving a display effect of the preview.

DETAILED DESCRIPTION

The following describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts shall fall within the protection scope of this application.

Terms "first" and "second" in the specification and claims of this application are used to distinguish between similar objects, and do not need to be used to describe a specific order or sequence. It should be understood that data used in this way may be interchangeable in an appropriate case, so that the embodiments of this application can be implemented in a sequence other than those shown or described herein, and objects distinguished by "first" and "second" are generally of a same type, and a quantity of objects is not limited. For example, there may be one or more first targets. In addition, in the specification and the claims, "and/or" represents at least one of connected objects, and the character "/" generally represents an "or" relationship between associated objects.

With reference to the accompanying drawings, an image obtaining method provided in embodiments of this application is described in detail below by using an embodiment and an application scenario thereof.

Figure 1:
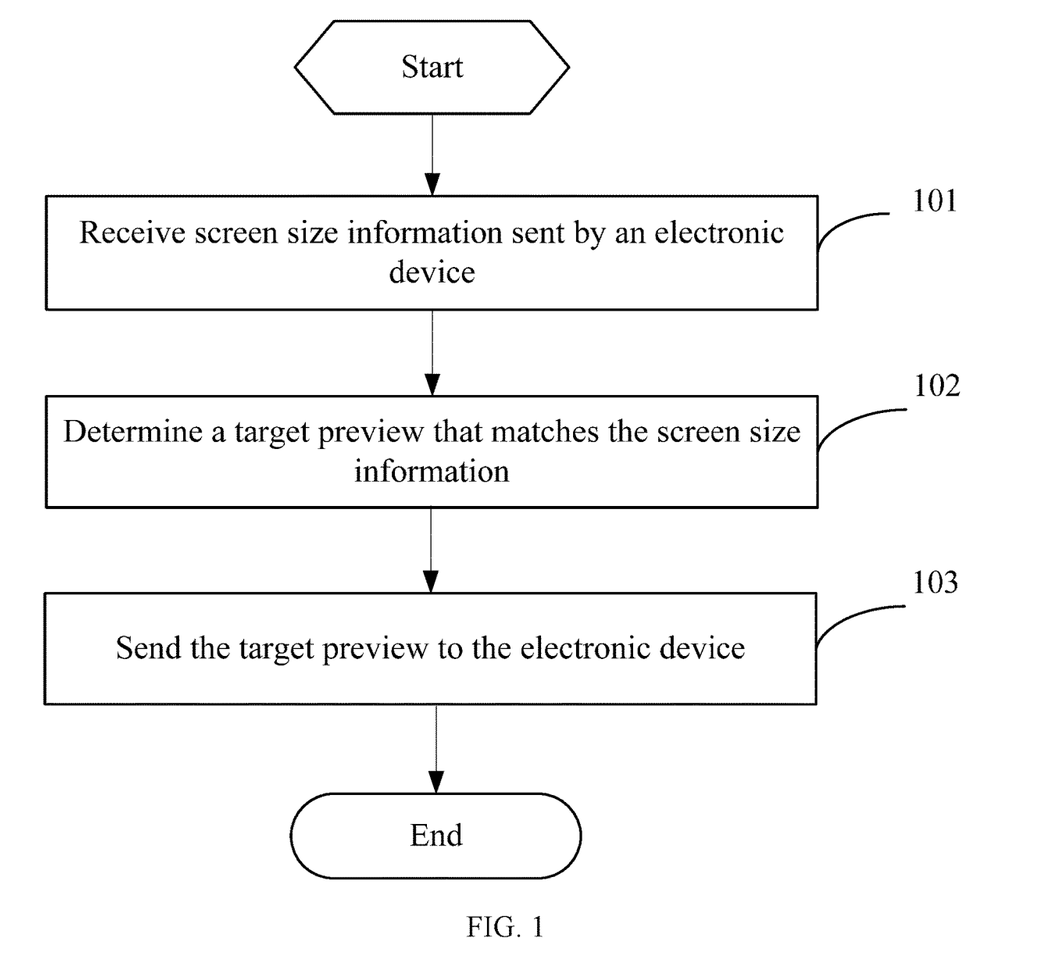
FIG. 1 is a flowchart of an image obtaining method according to an embodiment of this application.

FIG. 1 is a flowchart of an image obtaining method according to an embodiment of this application. As shown in FIG. 1, the image obtaining method is applied to a server and includes:

Step 101: Receive screen size information sent by an electronic device.

The screen size information is screen size information of a display screen of the electronic device. The electronic device may directly send a display screen size to the server explicitly or implicitly. Explicit sending means that the electronic device may directly send the screen size information to the server. Implicit sending means that a product model of the electronic device is sent to the server, and the server learns the screen size information of the display screen of the electronic device based on the product model.

The screen size information may be resolution, and a quantity of pixels in a length direction and a quantity of pixels in a width direction may be determined based on the resolution, or the screen size information is a length-width ratio.

Step 102: Determine a target preview that matches the screen size information.

The server may pre-generate, based on an existing preview resource, multiple target previews that match different screen size information, and in a case that the server receives the screen size information, the server may select one target preview that matches the screen size information from the multiple target previews.

After receiving the screen size information, the server may also process the preview resource based on the screen size information to generate the target preview that matches the screen size information, or when failing to find the target preview that matches the screen size information from the multiple target previews, the server may process the preview resource based on the screen size information to generate the target preview that matches the screen size information.

Step 103: Send the target preview to the electronic device.

The target preview is sent to the electronic device. The target preview may include a wallpaper element. In addition, the target preview may further include one or more of an icon element, a pendant element, and a status bar element, and each element has a corresponding sub-picture. When the target preview is displayed on the electronic device, a sub-picture corresponding to the element in the target preview is displayed on the display screen of the electronic device.

The image obtaining method in this embodiment is used to provide previews suitable for different screen sizes for a user, so that the electronic device may directly display a preview based on a size of the preview, to prevent a case that the size of the preview does not match a size of the display screen of the electronic device from affecting a display effect of the preview.

In this embodiment, the server receives the screen size information sent by the electronic device, determines the target preview that matches the screen size information, and sends the target preview to the electronic device, to determine the target preview based on the screen size information of the electronic device, so that the electronic device may display the target preview that matches the screen size information of the electronic device, thereby improving a display effect of the preview.

In an embodiment of this application, the step 102 of determining a target preview that matches the screen size information includes:

obtaining an initial preview and a preview element;

adjusting a size of the initial preview to a target size based on the screen size information, to obtain an intermediate preview; and adjusting a display position of the preview element in the intermediate preview to obtain the target preview.

In some embodiments, the initial preview may be understood as a wallpaper. The preview element may include one or more of an icon element, a pendant element, and a status bar element. Each preview element includes a corresponding sub-picture. For example, the icon element includes an application icon, the icon may be considered as a sub-picture, and icons corresponding to different applications may be different. The pendant element includes a sub-picture corresponding to a pendant, and the status bar element includes a sub-picture corresponding to a status bar.

The preview element has a corresponding display position in the initial preview. For example, the status bar element is generally displayed at an upper end or a lower end of the initial preview, the pendant element is generally displayed in an upper half area of the initial preview, the icon element is generally displayed in a lower half area of the initial preview, and the display position of the preview element in the initial preview may be set according to an actual situation.

The initial preview has a size, and the size may not match the size of the display screen of the electronic device. In this embodiment, the size of the initial preview is adjusted, so that an obtained target size matches the screen size information, and an image obtained after the size of the initial preview is adjusted is the intermediate preview. The intermediate preview may be considered as a sub-picture corresponding to the wallpaper element in the target preview.

The target preview includes the intermediate preview, the preview element, and a display position of the preview element in the intermediate preview, and each element includes a corresponding sub-picture. The display position of the preview element in the initial preview may not be applicable to the intermediate preview. If the display position of the preview in the intermediate preview uses the display position of the preview element in the initial preview, a display effect may be affected.

To obtain a better display effect, the display position of the preview element in the intermediate preview may be adjusted after the intermediate preview is obtained.

In this embodiment, the size of the initial preview is adjusted to the target size based on the screen size information, to obtain the intermediate preview, and the display position of the preview element in the intermediate preview is adjusted to obtain the target preview, that is, the wallpaper element (that is, the initial preview) and the preview element are separately adjusted, so that a display effect of the finally obtained target preview is better.

In an embodiment of this application, the adjusting a size of the initial preview to a target size based on the screen size information, to obtain an intermediate preview includes:
  obtaining a first distance between a first area and a second area in the initial preview in a length direction;
  determining a length difference based on a first length and a second length of the initial preview, where the first length is determined based on the screen size information;
  determining a second distance between the first area and the second area in the length direction based on the length difference; and
  stretching or cutting an area between the first area and the second area in the initial preview, so that a distance between the first area and the second area in the length direction is the second distance, to obtain the intermediate preview.

In some embodiments, the initial preview may be a desktop wallpaper, a lock screen wallpaper, or the like in a desktop theme. Lengths or widths of previews in a same theme may be adjusted based on a preview of a home screen in the following embodiments. For example, if there are multiple previews in a same theme, when sizes of the multiple previews are adjusted based on the screen size information, a length or width direction of the preview of the home screen may be adjusted first based on the screen size information, and then another preview in the theme is adjusted in a same adjustment manner as that of the preview of the home screen.

Figure 2A:
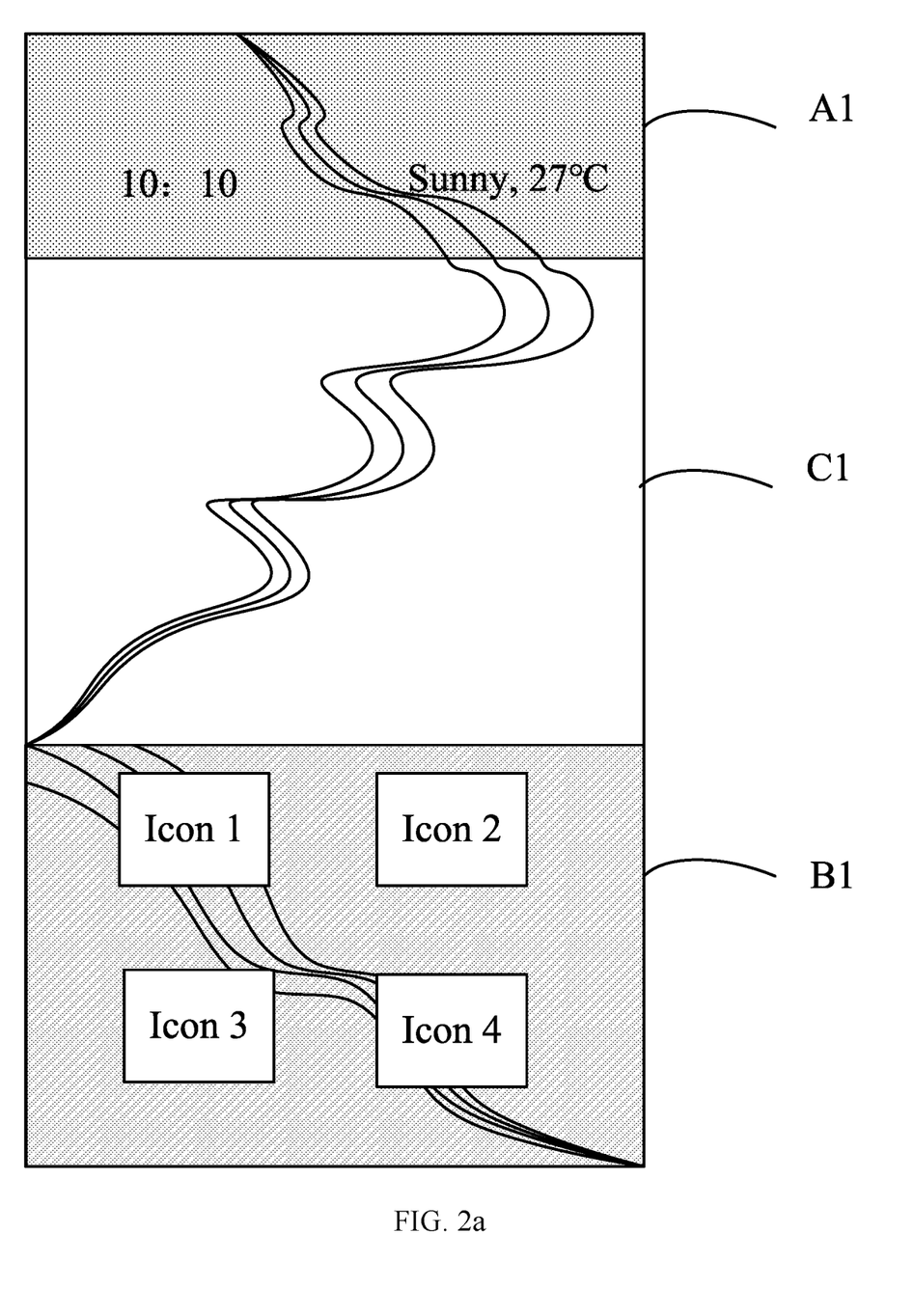
FIG. 2a is a schematic diagram of display of a screen of a first size according to an embodiment of this application.
Figure 2B:
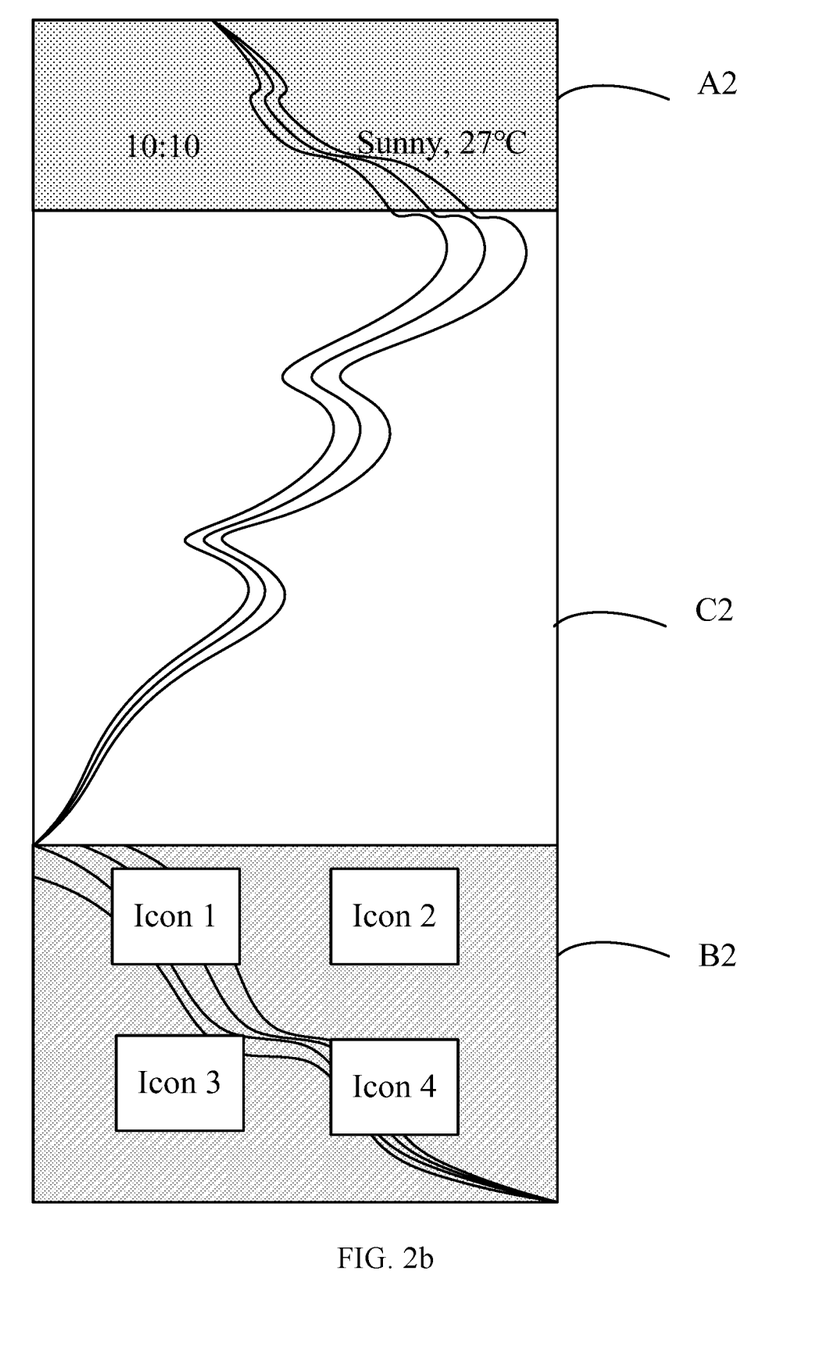
FIG. 2b is a schematic diagram of display of a screen of a second size according to an embodiment of this application.

The first area and the second area may be selected according to an actual situation. In this embodiment, the first area and the second area may be respectively a top area and a bottom area of the initial preview. For example, as shown in FIG. 2a, the first area is an area that is a first preset distance from the top of the initial preview, that is, an area shown by a symbol A1 in FIG. 2a. The second area is an area that is a second preset distance from the bottom of the initial preview, that is, an area shown by a symbol B1 in FIG. 2a, and a symbol C1 shows an area between the first area and the second area in the initial preview. The first preset distance and the second preset distance may be set according to an actual situation. This is not limited herein. It should be noted that a sum of the first preset distance and the second preset distance is not greater than a length of the initial preview. In FIG. 2a and FIG. 2b, icons 1, 2, 3, and 4 are separately icons of applications installed on the electronic device.

The preview element may include one or more of an icon element, a pendant element, and a status bar element. The first area and the second area may be further divided according to classification of the preview element. For example, an area displayed by the status bar element is the first area, and an area displayed by an icon element of an application is the second area.

The first length is determined based on the screen size information. If the screen size information is a length-width ratio of the display screen, after obtaining the screen size information, the server determines a quantity of pixels in the length direction and a quantity of pixels in the width direction based on the length-width ratio. For example, as shown in Table 1, in Table 1, a first column is a screen ratio, that is, the length-width ratio of the display screen of the electronic device, and a second column is corresponding resolution, that is, the quantity of pixels in the length direction and the quantity of pixels in the width direction.

TABLE 1

| Screen ratio | Resolution |
| --- | --- |
| 18:9 | 2160*1080 |
| 18.8:9 | 2256*1080 |
| 19:9 | 2280*1080 |
| 19.3:9 | 2316*1080 |
| 19.5:9 | 2340*1080 |
| 19.8:9 | 2376*1080 |
| 20:9 | 2400*1080 |
| 20.5:9 | 2460*1080 |
| 20.07:9 | 2408*1080 |

The first length is the quantity of pixels in the length direction. For example, it may be learned from Table 1 that if the screen ratio is 18:9, the quantity of pixels in the length direction is 2160. If the screen size information is the resolution, the quantity of pixels in the length direction may be directly learned based on the resolution.

A reference device is selected, and resolution of a display screen of the reference device is reference resolution. For example, 1920*1080 is selected as the reference resolution, the initial preview matches the resolution of the display screen of the reference device, and the second length of the initial preview may be understood as a quantity of pixels, in the length direction, of the reference resolution that matches the initial preview. In addition, the second length of the initial preview may also be understood as a quantity of pixels of the initial preview in the length direction.

Further, a difference operation is performed on the first length and the second length to obtain a length difference. If the length difference is a positive number, it indicates that the first length is greater than the second length of the initial preview, and the second length of the initial preview needs to be stretched, so that the second length matches the display screen of the electronic device. If the length difference is a negative number, it indicates that the first length is less than the second length of the initial preview, and the second length of the initial preview needs to be cut, so that the second length matches the display screen of the electronic device, to avoid a black side around the preview and improve a display effect.

In other words, in an initial case of the initial preview, the distance between the first area and the second area in the length direction is L1, and after a length difference M1 is added, the second distance is a sum of L1 and M1. If M1 is greater than 0, the distance between the first area and the second area in the length direction is increased, and an area between the first area and the second area in the initial preview may be stretched.

For example, if 1920*1080 is selected as the reference resolution, the initial preview matches the resolution of the display screen of the reference device, and the second length of the initial preview is a quantity of pixels, in the length direction, of the reference resolution that matches the initial preview. Resolution of the electronic device that is determined based on the screen size information is 2376*1080, and therefore, the first length is 2376, the second length is 1920, and a difference between the first length and the second length is 456 pixels. In this case, the area between the first area and the second area in the initial preview may be stretched, that is, an area shown in C1 in FIG. 2a is stretched in the length direction, and a distance of 456 pixels is increased, so that the intermediate preview is obtained. An effect achieved after stretching is shown in FIG. 2b.

FIG. 2a is a schematic diagram of an effect achieved when the initial preview is displayed on a display screen of a first size (that is, 16:9, where resolution is 1920*1080). FIG. 2b is a schematic diagram of an effect achieved when the target preview is displayed on a display screen of a second size (that is, 19.8:9, where resolution is 2376*1080). It may be learned from comparison FIG. 2a and FIG. 2b that a distance between the first area and the second area in FIG. 2b increases, that is, a length of an area shown by C2 is greater than a length of an area shown by C1.

To obtain a better display effect, after the intermediate preview is obtained, a display position of the preview element in the intermediate preview is adjusted, so that a display position of the adjusted preview element relative to an upper left corner or a lower left corner of the intermediate preview picture is the same as a display position of the unadjusted preview element relative to an upper left corner or a lower left corner of the initial preview.

In some embodiments, in the first area and the second area, if the first area is closer to the upper left corner (or the upper right corner) of the initial preview, a position, in the intermediate preview, of the preview element in the first area is adjusted based on a distance from the upper left corner (or the upper right corner) of the initial preview. In an area shown by A2 in FIG. 2b, a distance of a preview element in the area shown by A2 relative to the upper left corner of the initial preview is the same as a distance of a preview element in an area shown by A1 in FIG. 2a relative to the upper left corner of the intermediate preview.

In the first area and the second area, if the second area is closer to the lower left corner (or the lower right corner) of the initial preview, a position, in the intermediate preview, of the preview element in the second area is adjusted based on a distance from the lower left corner (or the lower right corner) of the initial preview. In an area shown by B2 in FIG. 2b, a distance of a preview element in the area shown by B2 relative to the lower left corner (or the lower right corner) of the initial preview is the same as a distance of a preview element in an area shown by B1 in FIG. 2a relative to the lower left corner (or the lower right corner).

If M1 is less than 0, the distance between the first area and the second area in the length direction is reduced, and an area between the first area and the second area in the initial preview may be cut.

In this embodiment, the size of the initial preview in the length direction is adjusted based on the screen size information. During adjustment, stretching or cutting is performed on the area between the first area and the second area, and the first area and the second area are not adjusted, that is, only a partial area of the initial preview in the length direction is adjusted, so that an adjustment area may be reduced as much as possible, and a display effect of the preview is further optimized.

In an embodiment of this application, the adjusting a size of the initial preview to a target size based on the screen size information, to obtain an intermediate preview includes:
obtaining a third distance between a third area and a fourth area in the initial preview in a width direction;
determining a width difference based on a first width and a second width of the initial preview, where the first width is determined based on the screen size information;
determining a fourth distance between the third area and the fourth area in the width direction based on the width difference; and
stretching or cutting an area between the third area and the fourth area in the initial preview, so that a distance between the third area and the fourth area in the width direction is the fourth distance, to obtain the intermediate preview.

In some embodiments, the third area and the fourth area may be selected according to an actual situation. In this embodiment, the third area and the fourth area may be respectively a left area and a right area of the initial preview. For example, the third area is an area that is of a third preset distance from the left of the initial preview, and the fourth area is an area that is of a fourth preset distance from the right of the initial preview. The third preset distance and the fourth preset distance may be set according to an actual situation. It should be noted that a sum of the third preset distance and the fourth preset distance is not greater than a width of the initial preview.

The first width is determined based on the screen size information. If the screen size information is a length-width ratio of the display screen, after obtaining the screen size information, the server determines a quantity of pixels in the length direction and a quantity of pixels in the width direction based on the length-width ratio. The first width is the quantity of pixels in the width direction.

A reference device is selected, and resolution of a display screen of the reference device is reference resolution. For example, 1920*1080 is selected as the reference resolution, the initial preview matches the resolution of the display screen of the reference device, and the second width of the initial preview may be understood as a quantity of pixels, in the width direction, of the reference resolution that matches the initial preview. In addition, the second width of the initial preview may also be understood as a quantity of pixels of the initial preview in the width direction.

Further, a difference operation is performed on the first width and the second width to obtain a width difference. If the width difference is a positive number, it indicates that the first width is greater than the second width of the initial preview, and the second width of the initial preview needs to be stretched, so that the second width matches the display screen of the electronic device. If the width difference is a negative number, it indicates that the first width is less than the second width of the initial preview, and the second width of the initial preview needs to be cut, so that the second width matches the display screen of the electronic device.

In other words, in an initial case of the initial preview, the distance between the third area and the fourth area in the width direction is L2, and after a width difference M2 is added, the fourth distance is a sum of L2 and M2. If M2 is greater than 0, the distance between the third area and the fourth area in the width direction is increased, and an area between the third area and the fourth area in the initial preview may be stretched. If M2 is less than 0, the distance between the third area and the fourth area in the width direction is shortened, and the area between the third area and the fourth area in the initial preview may be cut.

In this embodiment, the size of the initial preview in the width direction is adjusted based on the screen size information. During adjustment, stretching or cutting is performed on the area between the third area and the fourth area, and the third area and the fourth area are not adjusted, that is, only a partial area of the initial preview in the width direction is adjusted, so that an adjustment area may be reduced as much as possible, and a display effect of the preview is further optimized.

In the image obtaining method in this application, the server may store original preview materials, and generate a corresponding preview when a new screen ratio is subsequently added, to ensure compatibility of a subsequent model and improve a display effect of the preview.

Figure 3:
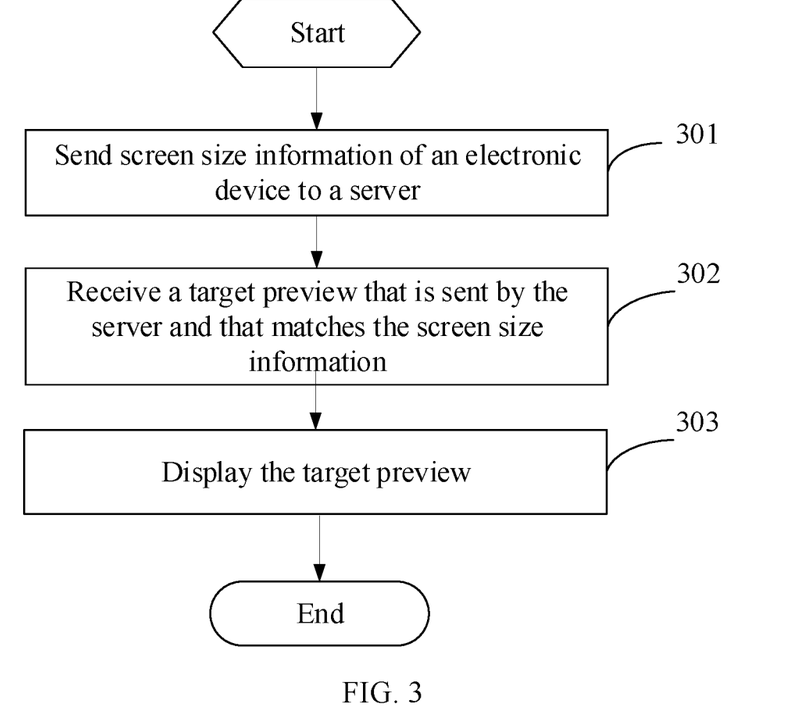
FIG. 3 is another flowchart of an image obtaining method according to an embodiment of this application.

As shown in FIG. 3, FIG. 3 is a flowchart of an image obtaining method according to an embodiment of this application. The image obtaining method provided in this embodiment is applied to an electronic device, and includes:

Step 301: Send screen size information of the electronic device to a server.

The screen size information is screen size information of a display screen of the electronic device. The electronic device may directly send a display screen size to the server explicitly or implicitly. Explicit sending means that the electronic device may directly send the screen size information to the server. Implicit sending means that a product model of the electronic device is sent to the server, and the server learns the screen size information of the display screen of the electronic device based on the product model.

The screen size information may be resolution, and a quantity of pixels in a length direction and a quantity of pixels in a width direction may be determined based on the resolution, or the screen size information is a length-width ratio.

Step 302: Receive a target preview that is sent by the server and that matches the screen size information.

The server may pre-generate, based on an existing preview resource, multiple target previews that match different screen size information, and in a case that the server receives the screen size information, the server may select one target preview that matches the screen size information from the multiple target previews.

After receiving the screen size information, the server may also process the preview resource based on the screen size information to generate the target preview that matches the screen size information, or when failing to find the target preview that matches the screen size information from the multiple target previews, the server may process the preview resource based on the screen size information to generate the target preview that matches the screen size information.

The target preview may include a wallpaper element. In addition, the target preview may further include one or more of an icon element, a pendant element, and a status bar element, and each element has a corresponding sub-picture. When the target preview is displayed on the electronic device, a sub-picture corresponding to the element in the target preview is displayed on the display screen of the electronic device.

For steps of how the server obtains the target preview, refer to the embodiment shown in FIG. 1. Details are not described herein again.

Step 303: Display the target preview.

After receiving the target preview, the electronic device displays the target preview. In some embodiments, the target preview includes an intermediate preview, and the intermediate preview is a sub-picture corresponding to a wallpaper element. The intermediate preview is also a picture that matches the screen size information of the electronic device and that is obtained after the size of the initial preview is adjusted.

The target preview may further include a preview element and a display position of the preview element in the intermediate preview, and each element has a corresponding sub-picture.

The image obtaining method in this embodiment is used to provide previews suitable for different screen sizes for a user, so that the electronic device may directly display a preview based on a size of the preview, to prevent a case that the size of the preview does not match a size of the display screen of the electronic device from affecting a display effect of the preview.

The electronic device in this embodiment sends the screen size information of the electronic device to the server, receives the target preview that is sent by the server and that matches the screen size information, and displays the target preview. The electronic device may obtain the target preview based on the screen size information, to obtain the target preview that matches the screen size information, thereby improving a display effect of the preview.

It should be noted that this embodiment of this application provides an image obtaining method on a server side, and an entity for execution may be a first image obtaining apparatus, or a control module, in the first image obtaining apparatus, configured to perform and load the image obtaining method. In this embodiment of this application, an example in which the first image obtaining apparatus performs and loads the image obtaining method is used to describe the image obtaining method provided in this embodiment of this application.

This embodiment of this application provides an image obtaining method on an electronic device side, and an entity for execution may be a second image obtaining apparatus, or a control module, in the second image obtaining apparatus, configured to perform and load the image obtaining method. In this embodiment of this application, an example in which the second image obtaining apparatus performs and loads the image obtaining method is used to describe the image obtaining method on the electronic device side provided in this embodiment of this application.

Figure 4:
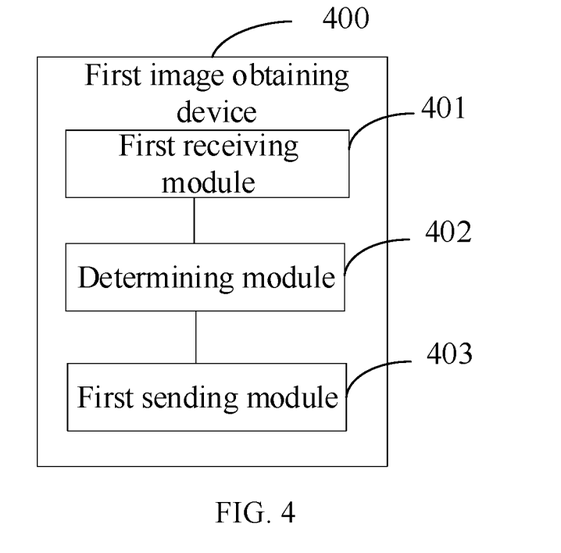
FIG. 4 is a structural diagram of a first image obtaining apparatus according to an embodiment of this application.

As shown in FIG. 4, FIG. 4 is a structural diagram of an image obtaining apparatus according to an embodiment of this application. The first image obtaining apparatus 400 provided in this embodiment is applied to a server and includes:

a first receiving module 401, configured to receive screen size information sent by an electronic device;

a determining module 402, configured to determine a target preview that matches the screen size information; and a first sending module 403, configured to send the target preview to the electronic device.

In an embodiment of this application, the determining module includes:

an obtaining submodule, configured to obtain an initial preview and a preview element;

a first adjustment submodule, configured to adjust a size of the initial preview to a target size based on the screen size information, to obtain an intermediate preview; and a second adjustment submodule, configured to adjust a display position of the preview element in the intermediate preview to obtain the target preview.

In an embodiment of this application, the first adjustment submodule is configured to:
obtain a first distance between a first area and a second area in the initial preview in a length direction;
determine a length difference based on a first length and a second length of the initial preview, where the first length is determined based on the screen size information;
determine a second distance between the first area and the second area in the length direction based on the length difference; and
stretch or cut an area between the first area and the second area in the initial preview, so that a distance between the first area and the second area in the length direction is the second distance, to obtain the intermediate preview.

In an embodiment of this application, the first adjustment submodule is configured to:
obtain a third distance between a third area and a fourth area in the initial preview in a width direction;
determine a width difference based on a first width and a second width of the initial preview, where the first width is determined based on the screen size information;
determine a fourth distance between the third area and the fourth area in the width direction based on the width difference; and
stretch or cut an area between the third area and the fourth area in the initial preview, so that a distance between the third area and the fourth area in the width direction is the fourth distance, to obtain the intermediate preview.

The first image obtaining apparatus 400 provided in this embodiment of this application can implement processes implemented by the server in the method embodiment of FIG. 1. To avoid repetition, details are not described herein again.

In this embodiment, the first image obtaining apparatus 400 receives the screen size information sent by the electronic device, determines the target preview that matches the screen size information, and sends the target preview to the electronic device, to determine the target preview based on the screen size information of the electronic device, so that the electronic device may display the target preview that matches the screen size information of the electronic device, thereby improving a display effect of the preview.

Figure 5:
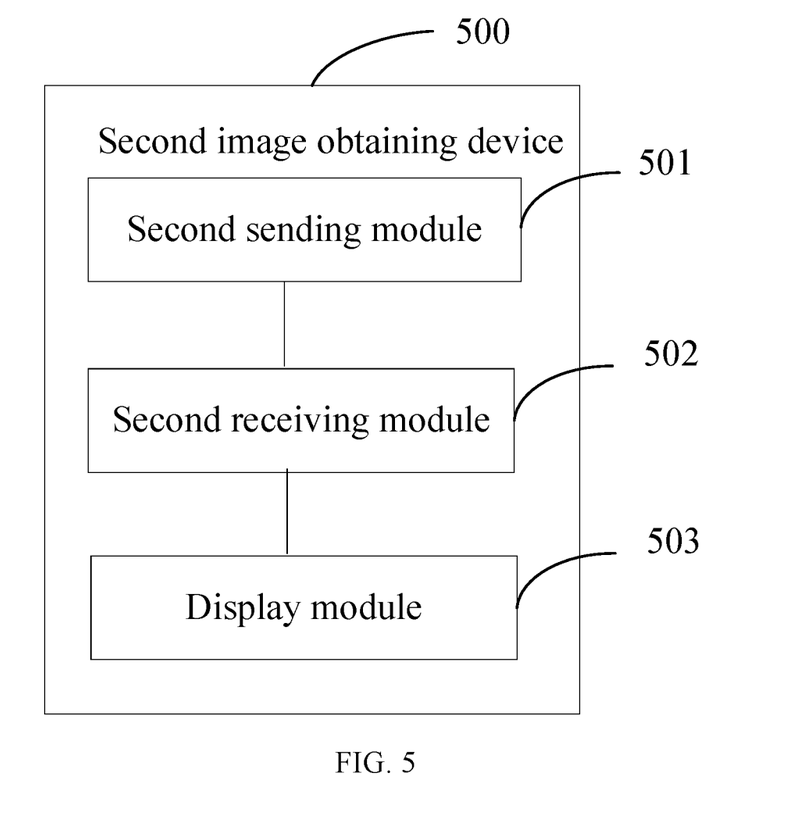
FIG. 5 is a structural diagram of a second image obtaining apparatus according to an embodiment of this application.

As shown in FIG. 5, FIG. 5 is a structural diagram of an image obtaining apparatus according to an embodiment of this application. A second image obtaining apparatus 500 provided in this embodiment is applied to an electronic device and includes:
a second sending module 501, configured to send screen size information of the electronic device to a server;
a second receiving module 502, configured to receive a target preview that is sent by the server and that matches the screen size information; and
a display module 503, configured to display the target preview.

The second image obtaining apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle terminal device, a wearable device, an Ultra-Mobile Personal Computer (UMPC), a netbook, or a Personal Digital Assistant (PDA), and the non-mobile electronic device may be a Network Attached Storage (NAS), a Personal Computer (PC), a Television (TV), a counter, or a self-service machine. This is not specifically limited in this embodiment of this application.

The second image obtaining apparatus in this embodiment of this application may be an apparatus with an operating system. The operating system may be an Android operating system, may be an iOS operating system, or may be another possible operating system. This is not specifically limited in this embodiment of this application.

The second image obtaining apparatus provided in this embodiment of this application can implement processes implemented by the electronic device in the method embodiment of FIG. 3. To avoid repetition, details are not described herein again.

The second image obtaining apparatus 500 in this embodiment sends the screen size information of the electronic device to the server, receives the target preview that is sent by the server and that matches the screen size information, and displays the target preview. The electronic device may obtain the target preview based on the screen size information, to obtain the target preview that matches the screen size information, thereby improving a display effect of the preview.

Figure 6:
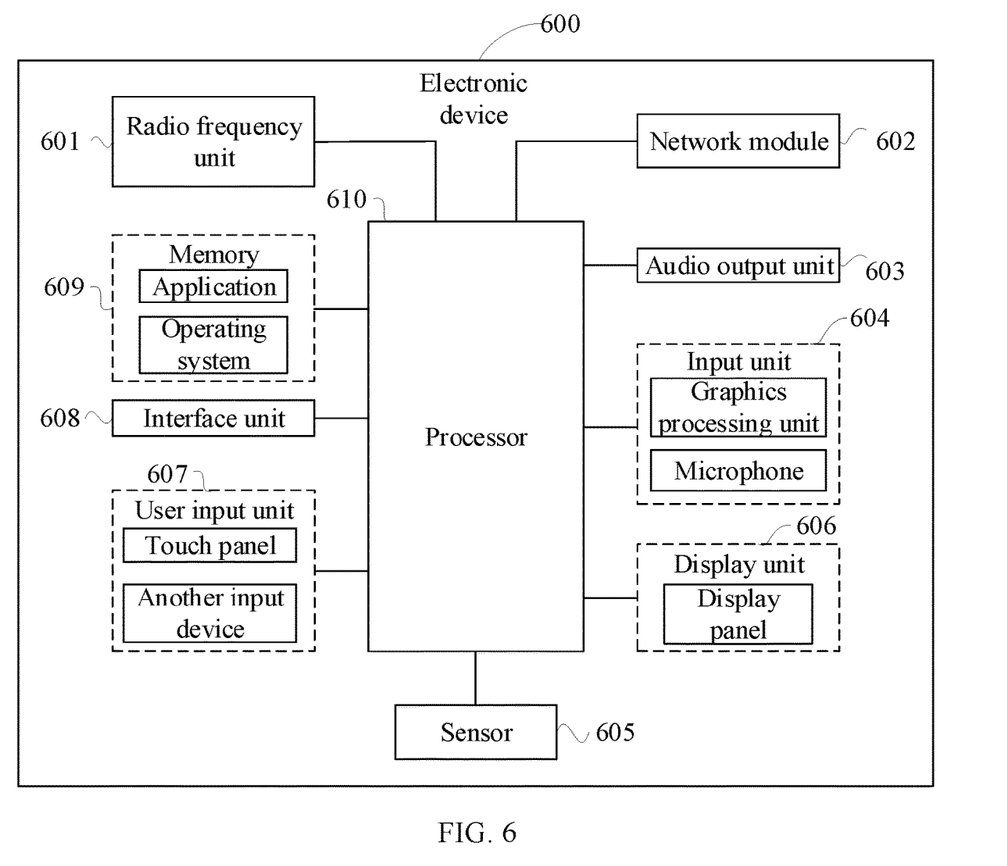
FIG. 6 is a structural diagram of an electronic device according to an embodiment of this application.

FIG. 6 is a schematic diagram of a hardware structure of an electronic device for implementing embodiments of this application. As shown in FIG. 6, an embodiment of this application further provides an electronic device, including a processor 610, a memory 609, and a program or an instruction that is stored in the memory 609 and that can run on the processor 610. When the program or the instruction is executed by the processor 610, processes of the embodiments of the image obtaining method can be implemented, and a same technical effect can be achieved. To avoid repetition, details are not described herein.

It should be noted that the electronic device in this embodiment of this application includes the foregoing mobile electronic device and the foregoing non-mobile electronic device.

The electronic device 600 includes but is not limited to components such as a radio frequency unit 601, a network module 602, an audio output unit 603, an input unit 604, a sensor 605, a display unit 606, a user input unit 607, an interface unit 608, a memory 609, and a processor 610.

It may be understood by a person skilled in the art that the electronic device 600 may further include a power supply (such as a battery) that supplies power to each component. The power supply may be logically connected to the processor 610 by using a power management system, to implement functions such as charging, discharging, and power consumption management by using the power management system. A structure of the electronic device shown in FIG. 6 does not constitute a limitation on the electronic device, and may include more or fewer parts than those shown in the figure, or combine some components, or have different part arrangements. Details are not described herein again.

The radio frequency unit 601 is configured to: send screen size information of the electronic device to a server, and receive a target preview that is sent by the server and that matches the screen size information.

The display unit 606 is configured to display the target preview.

The electronic device 600 in this embodiment sends the screen size information of the electronic device to the server, receives the target preview that is sent by the server and that matches the screen size information, and displays the target preview. The electronic device may obtain the target preview based on the screen size information, to obtain the target preview that matches the screen size information, thereby improving a display effect of the preview.

Figure 7:
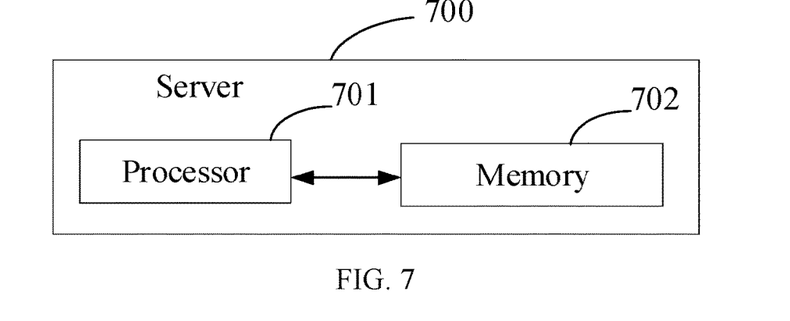
FIG. 7 is a structural diagram of a server according to an embodiment of this application.

As shown in FIG. 7, an embodiment of this application further provides a server, including a processor 701, a memory 702, and a program or an instruction that is stored in the memory 702 and that can run on the processor 701. When the program or the instruction is executed by the processor 701, processes of the embodiments of the image obtaining method in FIG. 1 can be implemented, and a same technical effect can be achieved. To avoid repetition, details are not described herein.

An embodiment of this application further provides a readable storage medium. A program or an instruction is stored in the readable storage medium. When the program or the instruction is executed by a processor, the processes of the embodiments of the image obtaining method can be implemented, and a same technical effect can be achieved. To avoid repetition, details are not described herein.

The processor is a processor in the electronic device in the foregoing embodiment. The readable storage medium includes a computer-readable storage medium such as a Read-Only Memory (ROM), a Random Access Memory (RAM), a magnetic disk, an optical disc, or the like.

An embodiment of this application further provides a chip. The chip includes a processor and a communication interface, the communication interface is coupled to the processor, and the processor is configured to run a program or an instruction to implement the processes of the embodiments of the image obtaining method, and a same technical effect can be achieved. To avoid repetition, details are not described herein again.

It should be understood that the chip mentioned in this embodiment of this application may also be referred to as a system-level chip, a system chip, a chip system, or a system on a chip.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or may be implemented by using hardware. In some embodiments, the technical solutions of this application or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described with reference to the accompanying drawings. However, this application is not limited to the foregoing implementations. The foregoing implementations are merely examples, but are not limiting. A person of ordinary skill in the art may make many forms without departing from the objective and the scope of the claims of this application, and these forms all fall within the protection scope of this application.

The invention claimed is:

1. An image obtaining method, performed by a server, comprising:
   receiving screen size information sent by an electronic device;
   determining a target preview image that matches the screen size information; and
   sending the target preview image to the electronic device,
   wherein the determining a target preview image that matches the screen size information comprises:
     obtaining an initial preview image and a preview element;
     adjusting a size of the initial preview image to a target size based on the screen size information, to obtain an intermediate preview image; and
     adjusting a display position of the preview element in the intermediate preview image to obtain the target preview image,
   wherein the adjusting a size of the initial preview image to a target size based on the screen size information, to obtain an intermediate preview image comprises:
     obtaining a first distance between a first area and a second area in the initial preview image in a length direction;
     determining a length difference based on a first length and a second length of the initial preview image, wherein the first length is determined based on the screen size information;
     determining a second distance between the first area and the second area in the length direction based on the length difference; and
     stretching or cutting an area between the first area and the second area in the initial preview image, so that a distance between the first area and the second area in the length direction is the second distance, to obtain the intermediate preview image; or
     obtaining a third distance between a third area and a fourth area in the initial preview image in a width direction;
     determining a width difference based on a first width and a second width of the initial preview image, wherein the first width is determined based on the screen size information;
     determining a fourth distance between the third area and the fourth area in the width direction based on the width difference; and
     stretching or cutting an area between the third area and the fourth area in the initial preview image, so that a distance between the third area and the fourth area in the width direction is the fourth distance, to obtain the intermediate preview image.

2. An image obtaining apparatus, comprising: a memory having a computer program stored thereon; and a processor, wherein the computer program, when executed by the processor, causes the processor to perform an image obtaining method, comprising:
- receiving screen size information sent by an electronic device;
- determining a target preview image that matches the screen size information; and
- sending the target preview image to the electronic device,
- wherein the determining a target preview image that matches the screen size information comprises:
  - obtaining an initial preview image and a preview element;
  - adjusting a size of the initial preview image to a target size based on the screen size information, to obtain an intermediate preview image; and
  - adjusting a display position of the preview element in the intermediate preview image to obtain the target preview image,
- wherein the adjusting a size of the initial preview image to a target size based on the screen size information, to obtain an intermediate preview image comprises:
  - obtaining a first distance between a first area and a second area in the initial preview image in a length direction;
  - determining a length difference based on a first length and a second length of the initial preview image, wherein the first length is determined based on the screen size information;
  - determining a second distance between the first area and the second area in the length direction based on the length difference; and
  - stretching or cutting an area between the first area and the second area in the initial preview image, so that a distance between the first area and the second area in the length direction is the second distance, to obtain the intermediate preview image; or
  - obtaining a third distance between a third area and a fourth area in the initial preview image in a width direction;
  - determining a width difference based on a first width and a second width of the initial preview image, wherein the first width is determined based on the screen size information;
  - determining a fourth distance between the third area and the fourth area in the width direction based on the width difference; and
  - stretching or cutting an area between the third area and the fourth area in the initial preview image, so that a distance between the third area and the fourth area in the width direction is the fourth distance, to obtain the intermediate preview image.

\* \* \* \* \*